United States Patent [19]

Melton et al.

[11] Patent Number: 4,862,378

[45] Date of Patent: Aug. 29, 1989

[54] PERFORATED WEB SEPARATOR

[75] Inventors: Stephen R. Melton, 8510 Henrietta Ave., St. Louis, Mo. 63144; Rebecca Redelsheimer, University City, Mo.

[73] Assignee: Stephen R. Melton, St. Louis, Mo.

[21] Appl. No.: 2,680

[22] Filed: Jan. 12, 1987

[51] Int. Cl.[4] .......................... G06F 15/46; B26F 3/02; B25H 35/10

[52] U.S. Cl. .......................................... 364/469; 225/4; 225/100; 270/52.5; 364/478

[58] Field of Search ........................ 364/468, 469, 478; 270/52.5, 58; 225/4, 5, 100, 101; 83/360-371, 209, 210

[56] References Cited

U.S. PATENT DOCUMENTS

| | | | |
|---|---|---|---|
| 3,559,519 | 2/1971 | Westphal | 83/210 |
| 3,699,832 | 10/1972 | Smith et al. | 83/210 |
| 3,763,728 | 10/1973 | Blackman | 83/210 |
| 3,956,954 | 5/1976 | Edwards | 83/285 |
| 3,987,949 | 10/1976 | Manning et al. | 225/100 X |
| 4,022,364 | 5/1977 | Davis | 225/100 |
| 4,069,957 | 1/1978 | Moffitt | 225/100 X |
| 4,091,978 | 5/1978 | Graham | 225/100 |
| 4,197,773 | 4/1980 | Kunzmann et al. | 83/209 |
| 4,527,791 | 7/1985 | Piotroski | 364/471 X |
| 4,529,114 | 7/1985 | Casper et al. | 225/100 |
| 4,577,789 | 3/1986 | Hofmann et al. | 225/100 |
| 4,593,893 | 6/1986 | Suter | 270/52.5 |
| 4,688,708 | 8/1987 | Irvine et al. | 225/100 |

*Primary Examiner*—Joseph Ruggiero

[57] ABSTRACT

A perforated web separator for separating a web of paper or forms which include a tractor feed strip. The tractor feed strips provide a plurality of holes that are used to control movement of the web through the separator in order that the web is separated at the desired, predetermined perforations. Sensors count the passage of holes in the tractor feed strips. An interface including analog-digital and digital-analog conversion blocks cooperates with the sensors and a central processing unit to control the perforated web separator. One pair of sensors is provided to transmit and receive horizontally across the moving web to sense a web jam.

14 Claims, 11 Drawing Sheets

FIG. 1.
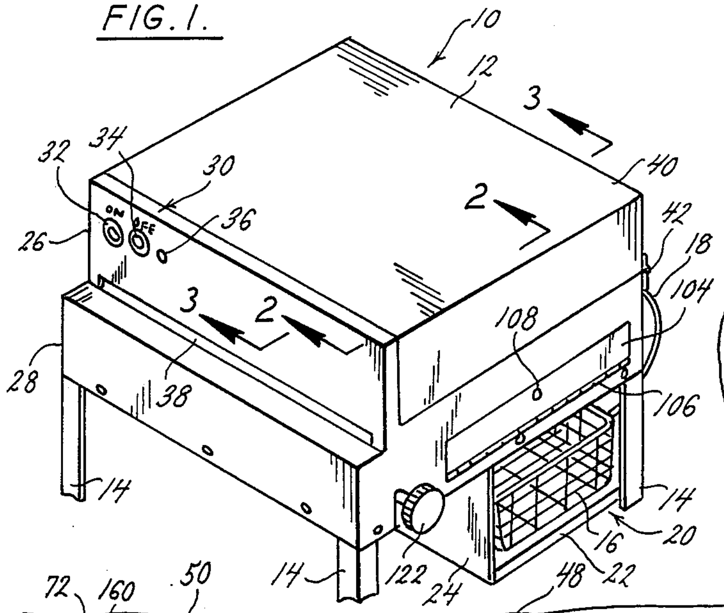
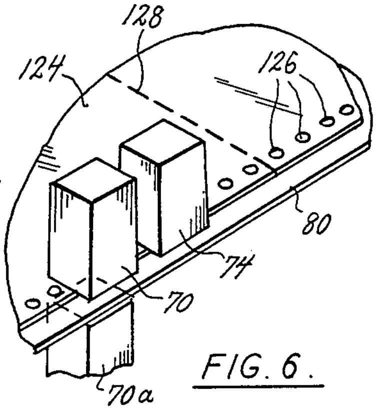
FIG. 6.
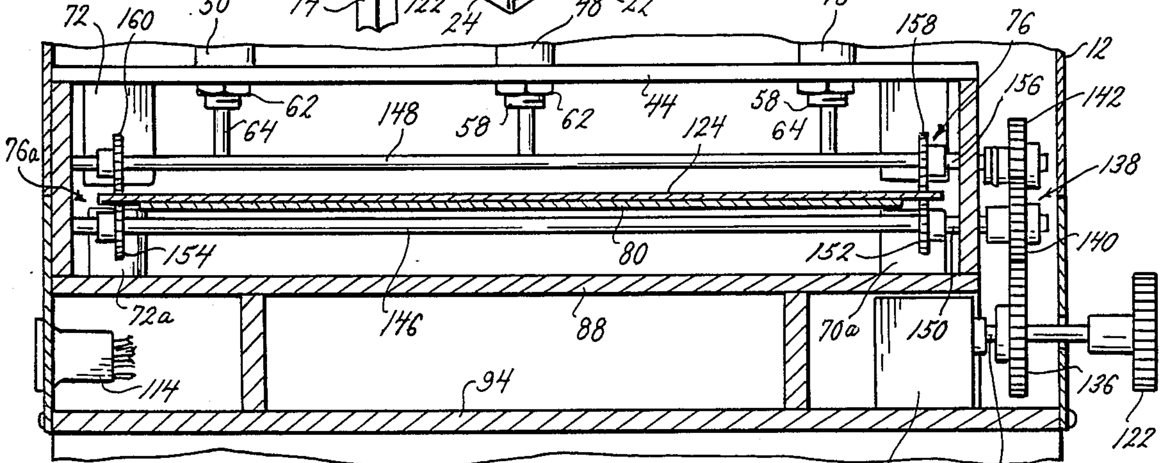
FIG. 4.
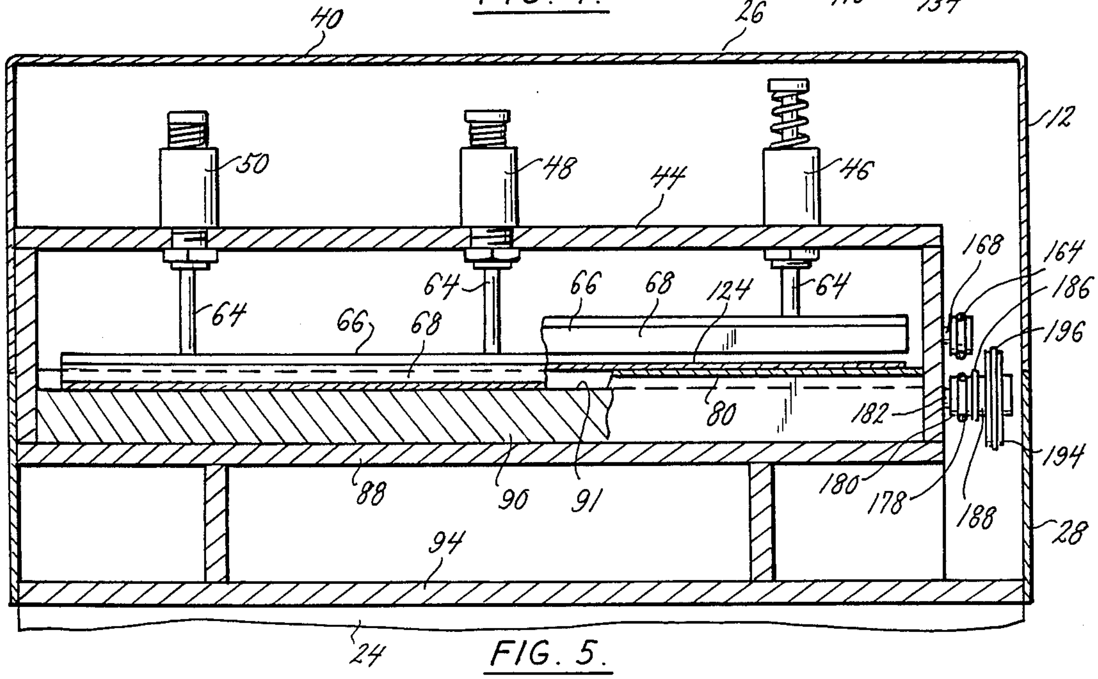
FIG. 5.

FIG. 9a.

```
* PROCEDURE cut_flow
 0000
 0001
 001F
 0030
 004A 1     DIM count:INTEGER
 0054       DIM cycle:INTEGER
 005B       DIM jerror:BOOLEAN
 0062       DIM answer:STRING[5]
 006E       DIM code:STRING[2]
 007A       DIM value:INTEGER
 0081       DIM plus:BOOLEAN
 0088       DIM cutter_path:INTEGER
 008F       cutter_path=7
 0096       DIM name:STRING[5]
 00A2       name:="/CT"
 00AC 10    cycle=0
 00B6       count=0
 00BD       SHELL "display c"
 00CA       PRINT
 00CC       PRINT
 00CE       PRINT " Enter the number of pages to be"
 00F2       PRINT "processed.  To request default, enter zero.

 0121       INPUT "Number = ",cycle
 0132       IF cycle=0 THEN
 013E         cycle=50
 0145       ENDIF
 0147       (* system operator can edit cycle default above *)
 0179       PRINT " Enter the number of tractor holes per"
 01A3       PRINT "page.  For default, enter zero."
 01C6       INPUT "Number = ",count
 01D7       IF count=0 THEN
 01E3         count=22
 01EA       ENDIF
 01EC       (* system operator can edit count default above *)
 021E       SHELL "display c"
 022B       FOR q=1 TO 5
 023D         PRINT
 023F       NEXT q
 024A       PRINT " Parameters are set at:"
 0265       PRINT
 0267       PRINT "Number of tractor holes per page: ",count
 0291       PRINT
 0293       PRINT "Number of pages to cut this run: ",cycle
 02BC       PRINT
 02BE       PRINT "Are these values correct?  Enter"
 02E2       INPUT "yes or no > ",answer
 02F6       IF answer="no" THEN
 0304         GOTO 10
 0308       ELSE
 030C         IF answer="NO" THEN
 031A           GOTO 10
 031E         ENDIF
 0320       ENDIF
 0322       SHELL "display c"
 032F       (* option lists *)
 0341       answer=""
 034B       PRINT
 034A       PRINT "  Options are all defaulted as indicated."
 0377       PRINT
```

FIG. 9b.

```
0379        PRINT "A zero signifies false or no.  Any possitiv
e"
03A9        PRINT "number signifies yes or true.  Number will"
03D7        PRINT "denote the number of times, spacing, etc."
0404        PRINT
0406        PRINT "Alternating Cut Length AC = 0"
0427        PRINT "( to cut sheets in two sizes )"
0449        PRINT "( this number = alternate holes per page )"
0477        PRINT
0479        PRINT "Alternating Cut Cycles CC = 0"
049A        PRINT "( must be < or = to standard cycle )"
04C2        PRINT
04C4        PRINT "Single Sheet Test Run SS = 0"
04E4        PRINT
04E6        PRINT "Baud Rate of Printer BR = 600"
0507        BR=600
0510        SS=0
0518        CC=0
0520        AC=0
0528 11     PRINT
052D        PRINT "If you wish to change a parameter, press"
0559        INPUT "a <C> otherwise press <ENTER> ",answer
057F        IF answer="" THEN
058B          GOTO 20
058F        ENDIF
0591        SHELL "display c"
059E        PRINT
05A0        PRINT
05A2        INPUT "Enter the letter code (ie. BR) : ",code
05CB        INPUT "Enter the new value (ie. 200 ) : ",value
05F4        IF code="AC" THEN
0602          AC=value
060B        ENDIF
060D        IF code="CC" THEN
061B          CC=value
0624        ENDIF
0626        IF code="BR" THEN
0634          BR=value
063D        ENDIF
063F        IF code="SS" THEN
064D          SS=value
0656        ENDIF
0658        PRINT
065A        PRINT "The new values are:"
0671        PRINT "AC = ",AC
067E        PRINT "CC = ",CC
068B        PRINT "BR = ",BR
0698        PRINT "SS = ",SS
06A5        PRINT "If these are correct, press <ENTER>
06CC        INPUT "otherwise press <C> :",answer
06E9        IF answer="" THEN
06F5          GOTO 20
06F9        ELSE
06FD          IF answer="C" THEN
070A            GOTO 11
070E          ENDIF
0710        ENDIF
0712 20     SHELL "display c"
0722        PRINT
0724        PRINT
0726        PRINT "           PROCESS RUNNING"
```

FIG. 9c.

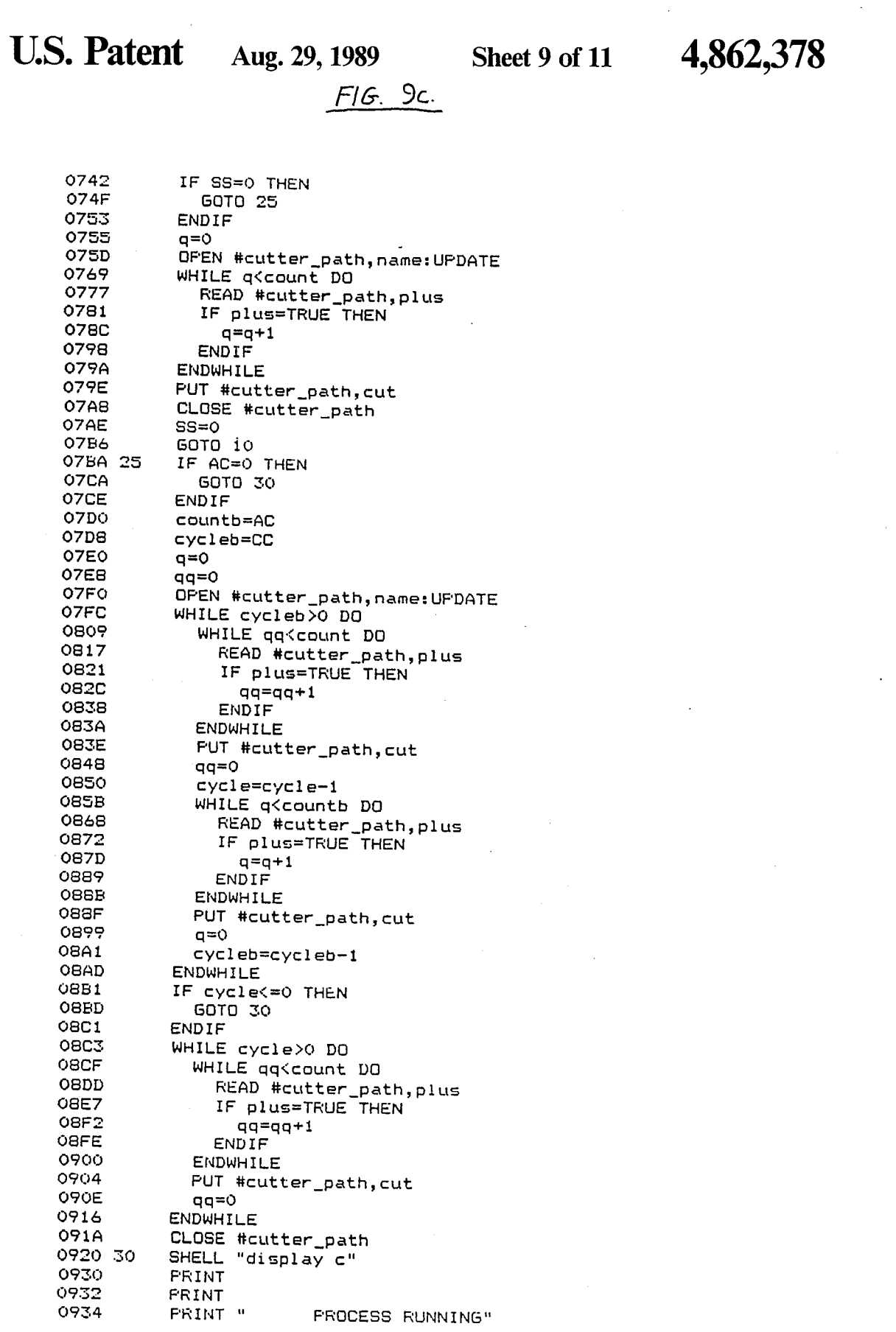

```
    IF SS=0 THEN
      GOTO 25
    ENDIF
    q=0
    OPEN #cutter_path,name:UPDATE
    WHILE q<count DO
      READ #cutter_path,plus
      IF plus=TRUE THEN
        q=q+1
      ENDIF
    ENDWHILE
    PUT #cutter_path,cut
    CLOSE #cutter_path
    SS=0
    GOTO 10
25  IF AC=0 THEN
      GOTO 30
    ENDIF
    countb=AC
    cycleb=CC
    q=0
    qq=0
    OPEN #cutter_path,name:UPDATE
    WHILE cycleb>0 DO
      WHILE qq<count DO
        READ #cutter_path,plus
        IF plus=TRUE THEN
          qq=qq+1
        ENDIF
      ENDWHILE
      PUT #cutter_path,cut
      qq=0
      cycle=cycle-1
      WHILE q<countb DO
        READ #cutter_path,plus
        IF plus=TRUE THEN
          q=q+1
        ENDIF
      ENDWHILE
      PUT #cutter_path,cut
      q=0
      cycleb=cycleb-1
    ENDWHILE
    IF cycle<=0 THEN
      GOTO 30
    ENDIF
    WHILE cycle>0 DO
      WHILE qq<count DO
        READ #cutter_path,plus
        IF plus=TRUE THEN
          qq=qq+1
        ENDIF
      ENDWHILE
      PUT #cutter_path,cut
      qq=0
    ENDWHILE
    CLOSE #cutter_path
30  SHELL "display c"
    PRINT
    PRINT
    PRINT "      PROCESS RUNNING"
```

```
094D    OPEN #cutter_path,name
0957    qq=0
095F    WHILE cycle>0 DO
096B      WHILE qq<count DO
0979        READ #cutter_path,plus
0983        IF plus=TRUE THEN
098E          qq=qq+1
099A        ENDIF
099C      ENDWHILE
09A0      qq=0
09A8      PUT #cutter_path,cut
09B2      cycle=cycle-1
09BD    ENDWHILE
09C1    CLOSE #cutter_path
09C7    SHELL "display c"
09D4    PRINT
09D6    PRINT
09D8    PRINT "     PROCESS FINISHED"
09F1    PRINT
09F3    PRINT "Do you wish to run another"
0A11    INPUT "cycle? Y/N : ",answer
0A26    IF answer="n" THEN
0A33      END
0A35    ENDIF
0A37    IF answer="N" THEN
0A44      END
0A46    ENDIF
0A48    GOTO 1
0A4C    END
```

FIG. 9d.

FIG. 10.
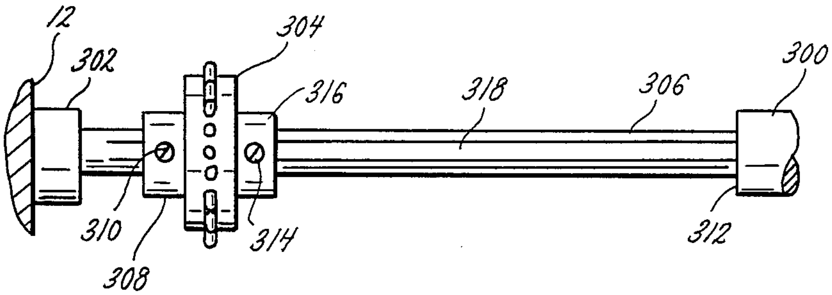
FIG. 11.
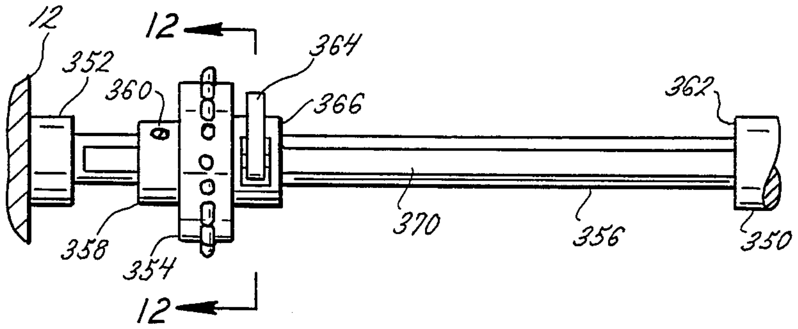
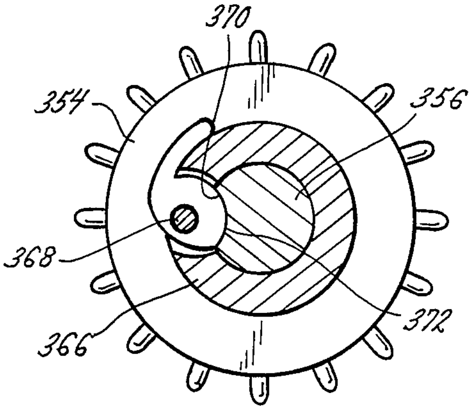
FIG. 12.

PERFORATED WEB SEPARATOR

BACKGROUND OF THE INVENTION

This invention relates generally to a device for separating perforated sheets of paper in the form of a web or continuous sheet and more particularly to a paper separator for continuously feeding and continuously separating the web of perforated sheets fed through the separator.

A number of separating devices are available for separating a series of sheets whether or not perforated in which the sheet is sequentially advanced, separated at a perforation or cut and then advanced again to a next perforation or location to be separated or cut. These devices generally rely on coding means located on the paper or perforated sheet to be cut or separated and a sensing means to sense the coding means and stop the paper or sheet at the proper location to allow a cutting device or other separating means to cut or separate the paper or sheet. The paper or sheet to be separated will generally be in the form of a web. The web may include more than one sheet such as is the case in many perforated business forms presently in use.

Reference is made to U.S. Pat. No. 4,593,893 for a METHOD AND APPARATUS FOR SEQUENTIALLY ADVANCING AND CUTTING FORMS FROM TWO CONTINUOUS FORM-WEBS, issued June 10, 1986; U.S. Pat. No. 4,577,789 for DEVICE FOR SEVERING SETS OF ENDLESS FORMS OR THE LIKE, issued Mar. 25, 1986; U.S. Pat. No. 4,529,114 for a FORM BURSTER, issued July 16, 1985; U.S. Pat. No. 4,197,773 for a DEVICE FOR CUTTING A WEB INTO PREDETERMINED SECTIONS, issued Apr. 15, 1980; U.S. Pat. No. 3,956,954 for a ROTARY PAPER CUTTING DEVICE, issued May 18, 1976; U.S. Pat. No. 3,763,728 for a BIMODAL FILM CUTTER ADAPTED TO HANDLE DIFFERENT FILM WIDTHS, issued Oct. 9, 1973; U.S. Pat. No. 3,699,832 for a CONTROL CIRCUIT FOR AUTOMATING THE OPERATION 0F A FILM CUTTER OR LIKE APPARATUS, issued Oct. 24, 1972; and U.S. Pat. No. 3,559,519 for AUTOMATIC DISPENSERS OF PRINTED GUM TAPE, issued Feb. 2, 1971.

The separating devices presently available include a number of drawbacks. Some of the drawbacks include the wear and tear on a device and its components resulting from the number of starting and stopping operations required to cut or separate the webs. The need for constant starting, stopping and re-starting of the device will probably result in the device having a poor maintenance record as well. Therefore, not only must the device be oversized and overdesigned to function continuously, but the extra cost and complexity may only result in a complicated machine that experiences periodic breakdowns.

Another drawback to some of the devices presently available would appear to be their accuracy. As previously mentioned, the presently available devices generally include a sensor to sense a coded portion of the web. Thus, if either sensor response deteriorates, or if the coded portion includes defects, gaps or voids, for example, then the device may not cut or separate the web at the proper location. Furthermore, it is possible that, depending upon the spacing between the coded portions on the web, the errors introduced into the cutting or separating of the web may accumulate so as to completely obliterate, destroy or otherwise make unusable the separated sheets.

The continuous separator of the present invention solves these and other problems in a manner not disclosed in the known prior art.

SUMMARY OF THE INVENTION

The continuous paper or web separating device of the present invention provides a separating device suitable for use with generally any web of transversely perforated sheets that also includes at least two longitudinal tractor feed strips including a plurality of holes in serial relationship along the length of the tractor feed strip. The separating device of the present invention is particularly suited for use in conjunction with a printer of a word processing system or a data processing system. Furthermore, the separating device may be used to separate a series of different length forms by establishing a necessary set of commands between a central processing unit and the separating device.

The continuous separating device of the present invention includes a housing for a tractor feed means for feeding a length of continuous and perforated web into operative association with the separating device. As previously mentioned the web includes transverse, longitudinally spaced apart perforation lines and at least two tractor feed strips including therein a plurality of holes in serial relationship along the length of the tractor feed strip. The separating device further includes a sensor means for sensing the feeding of a predetermined length of the web by the tractor feed means. In the present invention the sensor means is responsive to the passage of the holes in the tractor feed strip and the separating device is responsive to the passage of a predetermined number of holes in the tractor feed strip. A means for separating the length of web along perforation lines is provided. The separation means acts in response to a count of holes from the sensor means as the web is continuously fed through the paper separating device. An interface means is provided for accomplishing integrated and continuous operation of the tractor feed means, sensor means and separating means so that separation of the web at the desired perforation lines may be accomplished during continuous operation of the separating device. In a preferred embodiment the separating device is used to separate a web of perforated paper, for example, business forms o continuous form paper normally used in conjunction with a word processing or data processing system.

It is an aspect of this invention that the separating device provides a separator capable of separating a perforated web at either each perforation or at predetermined perforations.

It is another aspect of this invention that a separator device is provided for separating a web of perforated paper wherein the web includes at least one longitudinal tractor feed strip and the holes in the tractor feed strip are counted by sensing means to accurately determine operation of the separating means.

It is another aspect of the invention that a separator device capable of being integrated with a word processing and data processing system is provided.

It is yet another aspect of the present invention that a separator device is provided having an operational flexibility that allows different predetermined lengths of perforated webs to be separated consecutively without, for example, the need to change the web or stop and then re-start the separator device.

It is another aspect of the present invention to provide a separator device that is easy to use and one that can be readily integrated with existing word and data processing systems and printers and printing systems generally used to print webs of paper, for example, business forms or multiple copies of printed manuals.

It is yet another aspect of the present invention to provide a separator device that is generally portable and thereby easily moved between a plurality of printer stations as required.

In another aspect of the present invention the separator device is provided with the capability of accepting different width webs with only minor adjustment to the device.

BRIEF DESCRIPTION OF THE DRAWINGS

Further features, aspects and characteristics of the present invention can be seen from figures and descriptions below in which:

FIG. 1 is a perspective view of an embodiment of the separating device of the present invention;

FIG. 4 is a partial sectional elevation of the separating device generally taken along a line 4—4 in FIG. 3;

FIG. 5 is a sectional elevation of the separating device generally taken along a line 5—5 in FIG. 3;

FIG. 6 is a partial view of an arrangement of sensors of an embodiment of a separating device of the present invention;

FIGS. 9*a*–*d* represent a source code;

FIG. 10 is a partial elevation of one adjustable embodiment of the separating device of the present invention;

FIG. 11 is a partial elevation of another adjustable embodiment of the separating device of the present invention; and FIG. 12 is a section taken along a line 12–12 in FIG. 11.

DESCRIPTION OF THE PREFERRED EMBODIMENT

Figures 2, 3:
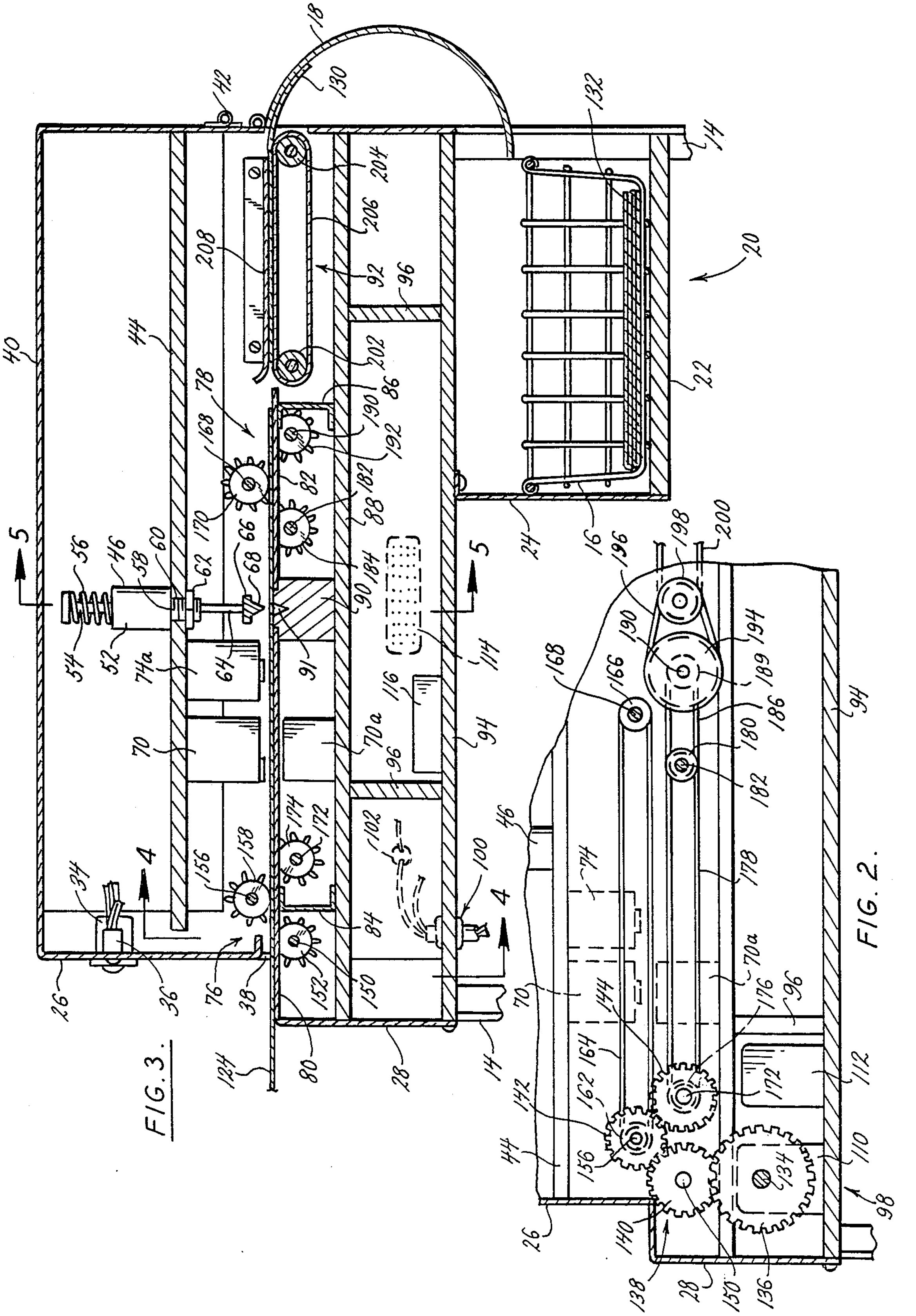
FIG. 2 is a partial sectional view of the separating device taken along, a line 2—2 in FIG. 1.
FIG. 3 is a sectional elevation of the separating device generally taken along a line 3—3 in FIG. 1.

Referring by characters of reference to the drawings and first to FIG. 1 it will be understood that a separator device generally indicated by reference character 10 is enclosed in a housing 12 and rests on a plurality of legs 14. Attached to the bottom of separator 10 in one embodiment is a separated sheet-receptacle or basket 16 associated with a separated sheet diverter 18. A basket support 20 includes a basket support shelf 22 having a backwall 24. In one embodiment the basket 16 is removably received by basket support 20 and rests on the basket support shelf 22. If the basket 16 is not used the diverted sheets may be allowed to stack up on the support shelf 22 since there travel will be limited by backwall 24.

The housing 12 includes an upper housing portion 26 and a lower housing portion 28. A control panel generally indicated by reference character 30 is located on the upper housing portion and includes a power on switch 32, power off switch 34 and a running light 36.

Located generally between the upper housing portion 26 and lower housing portion 28 is a web feed slot 38 for feeding a perforated web into the separator device.

The housing 12 may be provided with an upper housing cover 40 swingingly attached to upper housing portion 26 by means of upper housing portion cover hinge 42.

Referring now to FIGS. 2 and 3 it will be seen that in the illustrated embodiment an intermediate support shelf 44 divides the upper housing portion into an upper and lower section and provides a support for a separating means. The separating means in the illustrated embodiment is provided by first, second and third electric solenoids 46, 48 and 50, respectively.

Electric solenoid 46 shown in the section illustrated in FIG. 3 is typical and includes a coil housing 52, a shaft 54, a spring 56 and a threaded end 58 for placement through an opening 60 in the intermediate support shelf 44. A threaded nut 62 below the intermediate support shelf secures the solenoid in place. A shaft extension 64 extends down into the lower section of upper housing portion 26. The shaft extension 64 carries a separating member 66 having a separating edge 68.

In the described embodiment a sensor means for sensing the feeding of a predetermined length of web includes a plurality of electric eye transmitting and receiving devices in pairs. The first two pairs, transmitter and receiver 70, 70A and 72, 72A function as hole counting sensors. The third pair, 74, 74A are flow error detection sensor transmitter and receiver, respectively, and function to indicate a web jam within the separator by sensing an interruption of a signal transmitted between the transmitter and the receiver. A signal interruption will be presumed to be the result of a portion of the web "bunching up" due to a failure to feed the web properly through the separator device.

A drive means, including a tractor feed means for the described embodiment, is illustrated in FIGS. 2 through 6. In FIG. 4 it is illustrated how web feed sprocket sets are provided in pairs as in opposing pair, 76 and 76A illustrated in FIG. 4. One of a pair of web feed sprocket sets is illustrated in FIG. 3 and indicated generally by reference character 78.

Supporting the web as it moves through the separator device is a first web support plate 80 and a second web support plate 82 as shown in FIG. 3. In the illustrated embodiment the web support plates extend between and support the web between tractor feed strips thereby providing support for the web as it moves through the separator device while allowing the web feed sprockets to engage a series of holes in opposing tractor feed strips. A first channel support member 84 and a second channel support member 86 may be used to support the web support plates 80 and 82. The web support plates may also be supported by a cutting or separating anvil 90 which is in turn supported by an anvil support shelf 88. The anvil 90 includes an edge receiving notch 91 for receiving separating edge 68 that facilitates separation of the web at the perforations.

After the perforated web is separated into sheets a separated sheet drive unit 92 transfers the separated sheets of the web out of the separator and, in one embodiment, into the sheet divertor 18 and the basket 16. Although not shown, it will be understood that a separate motor may be used to drive the separated sheet drive unit 92.

The lower housing portion 28 includes a lower housing bottom plate 94 supporting a plurality of anvil plate supports 96 which in turn support the anvil support shelf 88.

The separator device of the present invention includes a drive system generally referred to by reference character 98. A dual power supply connection 100 from an external power source is shown as entering the lower housing portion 28 through lower housing portion bottom plate 94. The dual power supply includes a fuse 102. It will be noted, as illustrated in FIG. 1 ease of access to the lower housing portion is provided by lower housing access door 104 which is hingedly attached to the lower housing portion by access door hinge 106 and may be closed by means of lower housing access door latch 108 to restrict access to the internal components of the separator.

Continuing now with the description of one preferred embodiment of the drive system 98 it will be seen in FIG. 2 that there is provided a stepper motor 110 and stepper motor relay 112. Control signals for establishing a necessary set of commands between a central processing unit, for example, and the separating device through interface means, as will be further described below, are provided through a forty pin edge connector 114 and an interface 116 connected to stepper motor relay 112 as illustrated schematically in FIG. 7. Intermediate wiring and a cooling fan are not shown in the drawings since their location will be determined by actual size and dimensions of the separator device.

Manual means for advancing the web are provided by a stepper motor manual advance knob and shaft 122 operatively connected with the drive shaft of stepper motor 110.

Referring now by characters of reference to FIG. 6 it will be seen that a perforated web 124 includes a plurality of holes 126 in serial relationship located along a tractor feed strip located along an edge of web. The web includes at least one transverse perforation 128 and once separated the sheets move through the separator as shown in FIG. 3 with respect to a separated sheet 130 moving through divertor 18 to a stack of already separated sheets 132 located in basket receptacle 16.

A preferred embodiment of the means by which the web is moved through the separator device will now be described with reference generally to FIGS. 2 through 5. As previously discussed the stepper motor 110 provides the primary source of power for the drive system 98. A stepper motor drive shaft 134 is operatively connected to a stepper motor drive gear 136 which drives a power transfer gear group 138. The power transfer gear group 138 includes a first gear 140, a second gear 142 and a third gear 144 in cooperative relationship. A first power transfer shaft 146 is operatively connected to and driven by first gear 140. A second power transfer shaft 148 is operatively connected to and driven by gear 142. The drawings do not show a third power transfer shaft that is driven off of third gear 144. Connecting first power transfer shaft 146 and gear 140 is a first intermediate shaft 150 to which is attached a tractor feed sprocket 152. In the preferred embodiment illustrated in the drawings, tractor feed means are provided by a plurality of these tractor feed sprockets. A second tractor feed sprocket 154 is attached to the opposite end of first power transfer shaft 146. Similarly, a second intermediate shaft 156 is located between second gear 142 and a third tractor feed sprocket 158. At the opposite end of second power transfer shaft 148 a fourth tractor feed sprocket 160 is mounted. As previously mentioned the other tractor feed sprocket on the third power transfer shaft is not shown in the drawings but it will be understood that the relationship between the tractor feed sprockets is such that their cooperative, paired relationship enables them to feed the web through the separator device.

Power transfer gear group 138 provides power to the first web feed sprocket sets 76 and 76A and also provides power to a pulley system for driving the second web feed sprocket set 78 and a corresponding and opposing web feed sprocket set not shown in the drawing figures.

The pulley system is driven by the combination of a first pulley 162 and the second gear intermediate shaft 156 adjacent to second gear 142. A first pulley belt 164 operatively connected the first pulley 162 and a second pulley 166. In the preferred embodiment illustrated in the drawings a second pulley shaft 168 is attached to a fifth tractor feed sprocket 170 and drives this tractor feed sprocket and a sixth opposing tractor feed sprocket not shown in the drawings. A third intermediate shaft 172 carries a seventh tractor feed sprocket 174 for engagement with opposing longitudinal tractor feed strips. An eighth tractor feed sprocket located at the opposite end of the third power transfer shaft has not been shown.

A third pulley 176 is located adjacent third gear 144. An intermediate pulley belt 178 is located between third pulley 176 and one pulley 180 of a dual intermediate pulley which transfers the movement of intermediate pulley belt 178 to an intermediate pulley shaft 182. Attached to intermediate pulley shaft 182 is a ninth tractor feed sprocket 184. A tenth tractor feed sprocket and associated power transfer shaft are not shown but it will be understood from the previous description that the tractor feed sprockets are provided in pairs with one of each of the pair being located so as to engage the holes of an associated tractor feed strip for feeding the perforated web through the separator device.

A short pulley belt 186 engages another half 188 of the dual intermediate pulley and engages at its other end a final pulley 189. Another pulley shaft 190 connects pulley 189 with another eleventh tractor feed sprocket 192 and an oversize pulley 194. It will be understood that, since the tractor feed sprockets are provided in pairs, there is a twelfth tractor feed sprocket opposite tractor feed sprocket 192 on the opposite end of another power transfer shaft that has not been shown.

Larger pulley 194 engages a separated sheet drive pulley belt 196 and a first separated sheet drive pulley 198 and another separated sheet drive pulley operatively engaged with separated sheet drive pulley belt 200.

A first drive roller and shaft and a second drive roller and shaft 202, 204 respectively, are operatively connected to the separated sheet drive and transfer the rotation of these pulleys to drive a separated sheet transfer belt 206. In operation, as the web is separated along transverse perforations by the separating means the tractor feed sprockets drive each separated sheet into engagement with the separated sheet transfer belt. A separated sheet deflector shoe 208 deflects any tendency of the separated sheet to curl up so that each separated sheet is held between the separated sheet deflector shoe 208 and the separated sheet transfer belt 206.

Since pulley 194 is larger than the adjacent pulley 198, the separated sheets are fed through quicker than the perforated but unseparated web. This creates a gap between each separated sheet and the moving web and reduces the potential of a paper jam in the separated sheet drive unit 92, separated sheet divertor 18 and separated sheet receptacle or basket 16.

As previously discussed one of the aspects of the present invention is the ability to interface the paper separator with a word processing system or data processing system or a printer controlled by a word or data processing system. Therefore, it will be advantageous to the further understanding of the present invention to briefly describe one embodiment of an interface means between a central processing unit, printer peripheral and the separator device of the present invention.

Referring now by characters of reference to FIG. 7, a schematic of the interface between a central processing unit (CPU) 250 and the paper separator 10 will now be described in further detail.

The CPU 250 is connected to the separator through a first, second, third, fourth, and fifth connection 252, 254, 256, 258, and 260, respectively and preferrably through the forty pin edge connector 114 through a ribbon cable (not shown) between the edge connector 114 and the CPU 250. Edge connector 114 at the separator is connected to an interface means. The interface means provides for integrated and continuous operation of the tractor feed means, sensor means and separating means to accomplish separation of the web at the perforation during continuous operation of the separating device. The interface means includes a plurality of analog-digital conversion means and digital-analog conversion means. In a preferred embodiment the interface means includes a digital-analog-digital computer interface board 262 containing analog-digital and digital-analog conversion means, such as an 8-bit analog-digital conversion block 264 and an 8-bit digital-analog conversion block 266. As illustrated in FIG. 7, block 264 includes three 8-bit digital-analog conversion chips 268 and block 266 includes two 8-bit digital-analog chips 270. Each of the convertors is connected to CPU 250 through an appropriate pin connection.

The output signal from the 8-bit digital-analog block 266 when in a "high" or "true" state is used to close the circuit to the two relays 272, 273 which are then activated by a 12 volt DC current provided by a dual output regulated power supply 290. The 8-bit analog-digital conversion block 264 receives signals from sensor means located in the separator device. In a preferred embodiment as illustrated in the drawing, the sensor means include first photo detector 274 and first LED emitter 276, second photo detector 278 and second LED emitter 280, and third photo detector 282 and third LED emitter 284 which provide the required signal for sensing and counting holes in the tractor feed strip and a perforated web jam as the web passes through a sensor signal for the analog to digital conversion that takes place through the components located in block 264.

The dual output regulated power supply 290 provides 5 volts DC to the three transmitter-receiver pairs as well as 12 volts DC to the relays 272, 273, a 12 volt DC stepping motor 286, and separating means including a plurality of solenoids 288. The regulated power supply 290 has an external 110–115 VAC power input 292 which corresponds to power supply connection 100 illustrated in FIG. 3.

In order to better understand the operation of the present invention, one embodiment of the present invention and the associated components will now be described in greater detail.

For purposes of the following description, a Tandy TRS-80 Color Computer III will be presumed to be the word or data processing system to which a printer peripheral and the separator device of the present invention are attached. The TRS-80 Color Computer III is generally a Motorola 6809E based computer with a forty-pin cartridge connector input/output bus. However, it will be understood that generally any M6800, M6809, or M68000 series CPU base microcomputer in which this input/output bus is available in cartridge, pin-out, or hard wire form, along with any of several multi-tasking/multi-user operating systems (Microware OS-9, Xenix, or Bell UNIX) will be compatible with the present invention and the description herein. For purposes other than the contained description, most present state-of-the-art microcomputers can be programmed and used with the present invention. Under such circumstance the computer rather than the separator device would be modified for compatibility.

For purposes of the described embodiment the computer must be equipped with at least one disc drive, a drive controller, the Microware OS-9 operating system, and a TRS-80 Multi-pak Interface or equivalent. Reference is made in TABLE I for a parts list relevant to the described embodiment. It will be understood that RS numbers refer to Tandy-Radio Shack brand parts. It will be further understood that NE and DAC numbers refer to Signetics brand part identification. It will also be understood that all parts referred to or described in the present description may always be replaced by their equivalent state-of-the-art components manufactured by any number of manufacturers.

In the described embodiment the analog-digital converter 268 is an NE5034 8-bit A/D Converter as indicated in TABLE I. This is a high speed, microprocessor compatible, 8-bit analog to digital converter that uses a successive approximation conversion technique and includes a comparator, reference DAC, SAR, an internal clock and three state buffers on a single chip. One of the reasons that this converter is preferable is its ability to accommodate a wide analog input voltage range, either bipolar or unipolar, selectable through external input resistors. An external capacitor controls the internal clock frequency, thereby providing known conversion times as low as seventeen microseconds. It will be understood that faster conversion times will be possible if an external clock IC is used. Nominal characteristics of the NE5034 converter are indicated in TABLE II.

The DAC-08 series digital to analog converter is used in the presently described embodiment of the present invention as an output switching device to the solenoids controlling the separating means and the stepping motor relays in response to a predetermined movement of the web through the separator. The movement of the web through the separator device corresponds to the movement and count of the holes in the tractor feed strip, wherein the count is provided by the sensor means. Depending upon the application, an operational amplifier may be required to power the relay coil for the stepping motor if the relay coil current range is approximately 70 mA or greater. The circuit design of the DAC-08 8-bit D/A converter achieves 85 ns (nanoseconds) settling time with low power consumption.

In the standard circuit design of this component, dual complimentary outputs are provided and true high voltage compliance outputs allow direct output voltage conversion and eliminate the need for output operational amplifiers in many applications except as discussed above. The absolute maximum ratings of the described converter are illustrated in TABLE III.

Figure 7:
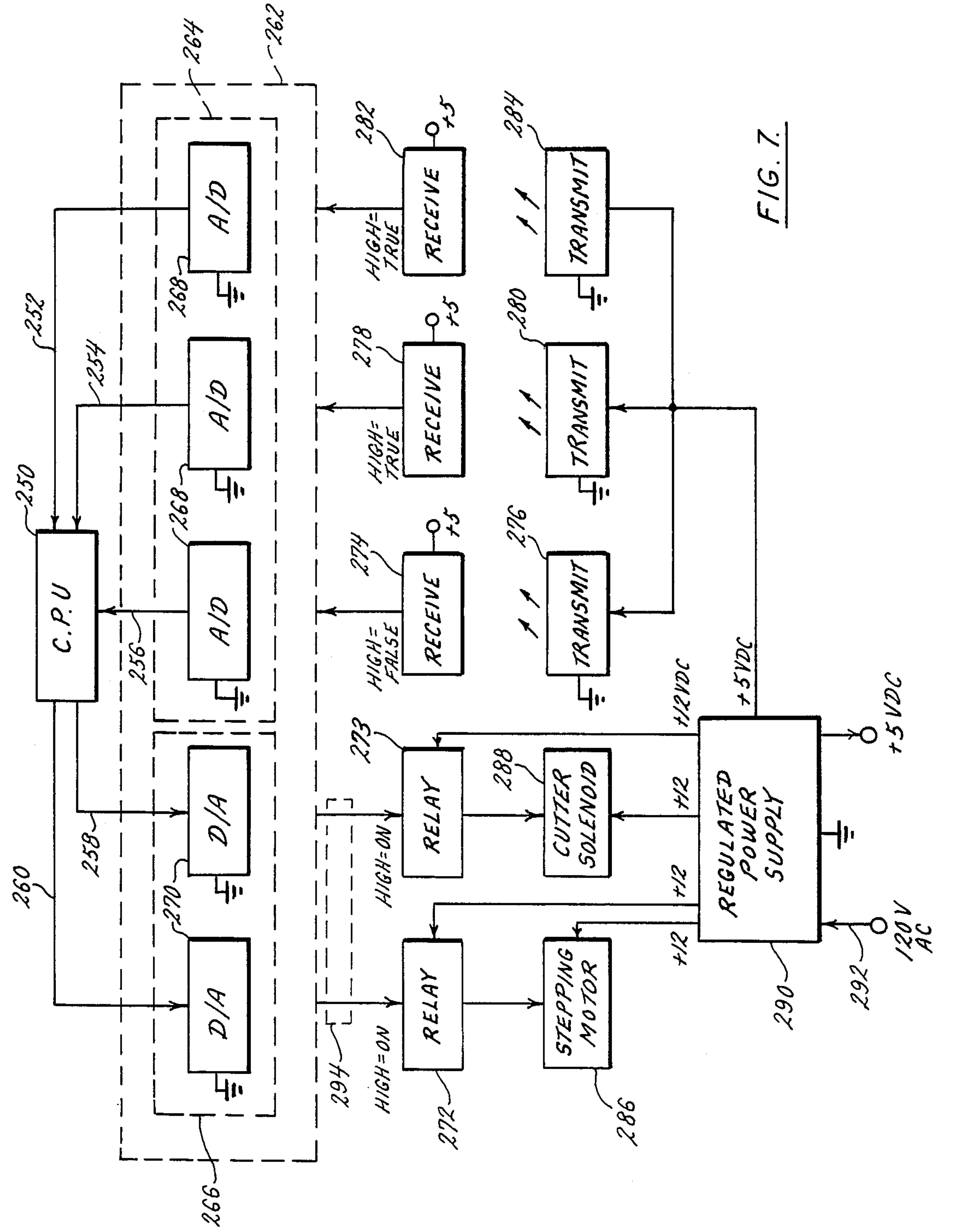
FIG. 7 is an operational block diagram of an embodiment of a separating device of the present invention.

Optionally, an addressable peripheral driver illustrated in FIG. 7 and identified by reference character 294 may be required to drive separating means relay coils that could be used in the separator device of the present invention. If necessary, an NE590 addressable peripheral driver or equivalent may be used having a high current latching switch device. Each output is capable of a load current of 250 mA. The outputs are turned on or off by respectively loading a logic high or logic low signal into the device data input line. The peripheral driver device must be enabled by a CE input line. A common "clear-input" (CLR) signal will be provided to turn off all outputs when a logic low signal is applied. The absolute maximum ratings for the herein described peripheral driver are illustrated in TABLE III.

The following portion of the description of a preferred embodiment of the present invention relates to process flow information and includes illustrations of general block diagrams of the procedural flow of operation of the separator device and the establishment of the necessary set of commands between the central processing unit and the separating device. The block diagrams will now be described in greater detail.

Prior to operation of the separator device of the present invention, the CPU of an associated microprocessor must be programmed with the specifications for the desired final output, speed, and duration. In the embodiment described herein, this may be accomplished through keyboard input on a TRS-80 Color Computer or equivalent as described previously. The programming for accomplishing this portion of the system initialization must be provided for each particular CPU type and operating system.

Figure 8A:
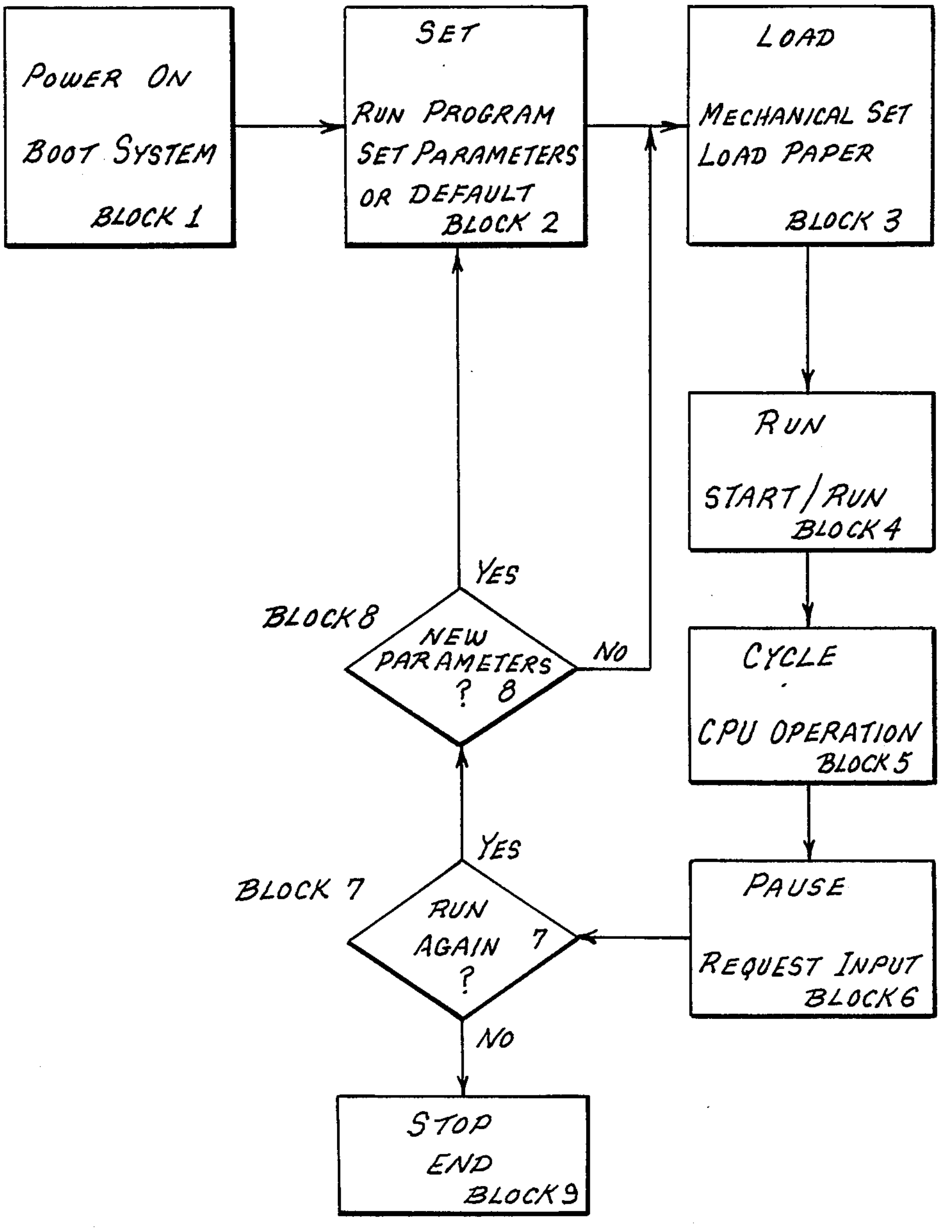
FIGS. 8*a*–*c* are procedural flow diagrams.

A SET block, Block 2, of the flow diagram FIG. 8*a* includes the steps of setting the flow specifications. This may be accomplished by initially turning on the central processing unit and the separating device, Block 1, and loading and running an operating system providing operational programming contained in software compatible with the particular computer and central processing unit for establishing the necessary set of commands between the CPU and the separating device. Next, the run-time parameters must be set. For ease of operation, defaults may be provided in the operating system to obtain a preselected standard as an option for the user. If the default is not selected, the user of the separator device must indicate the page length of each page between the perforations and this information must include the length in inches as well as the number of holes in the tractor feed strip corresponding to the desired page length. Another user programmable parameter may be the number of cycles; that is, the number of sheets that are to be processed by the separator device during this particular run. It will be understood that optional parameters may be provided for including, for example, providing for a single sheet test run, setting alternating cut lengths, and/or defining the cutting speed to match a particular printer output rate.

Typically the web of paper or forms is loaded or fed into the separator device, Block 3, and the necessary mechanical adjustments accomplished, for example, tractor feed sprockets are adjusted for the web width. Once the web is properly loaded or fed into the separator the system, that is, the combination of CPU, printer and separator is set to start and/or run, Block 4. The separator then cycles, Block 5, according to the Running Program including the set parameters or defaults which depend upon the system interfaced with the separator device. At the end of the run a pause, Block 6, will allow additional input including whether the Run Program requires another run or not, Block 7. If another run is not in the Run Program, then the system will stop and the Run Program will end, Block 9. If the system runs again, Block 8, either it will run again with the previous set parameters and/or defaults, Block 3, or another Run Program will set new parameters and/or defaults, Block 2.

Figure 8B:
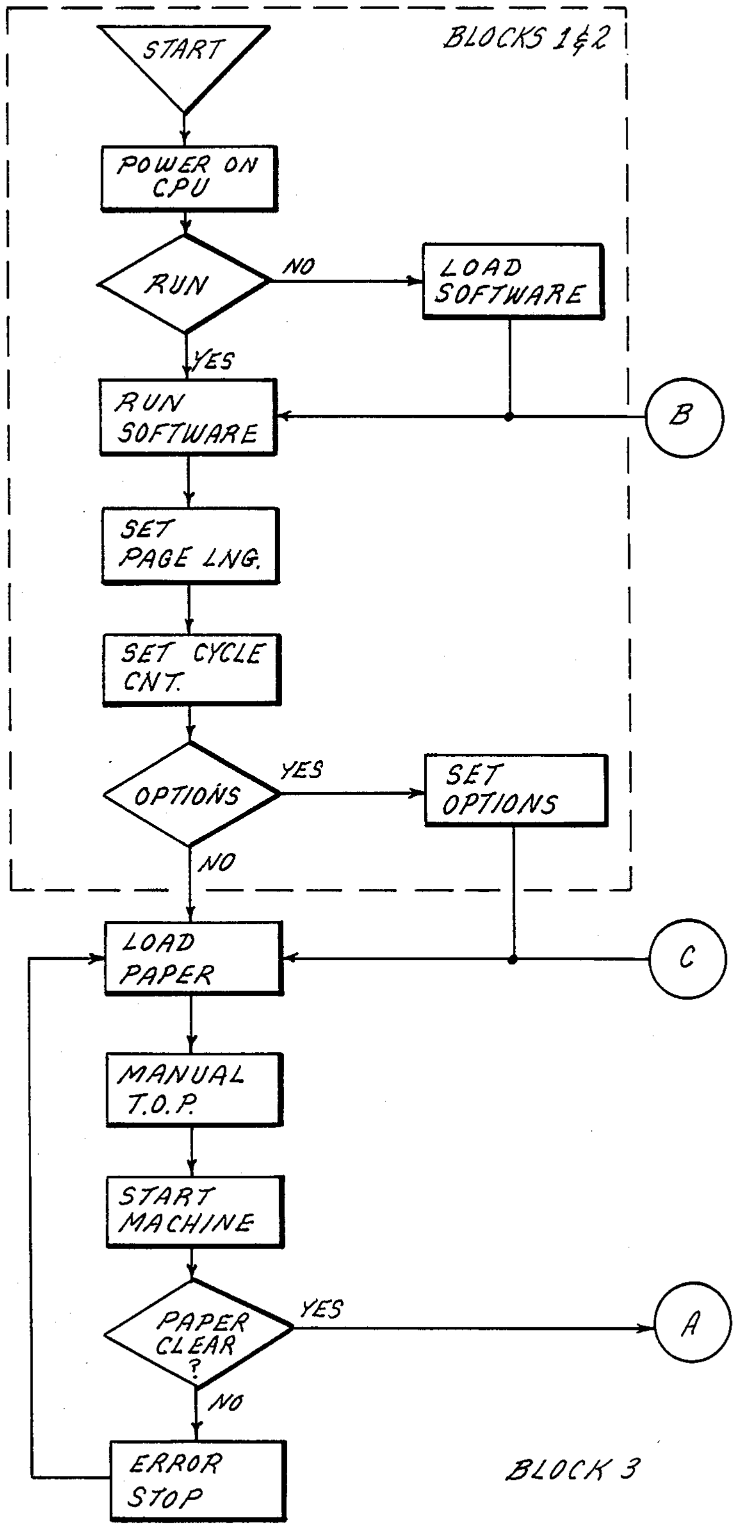
Figure 8C:
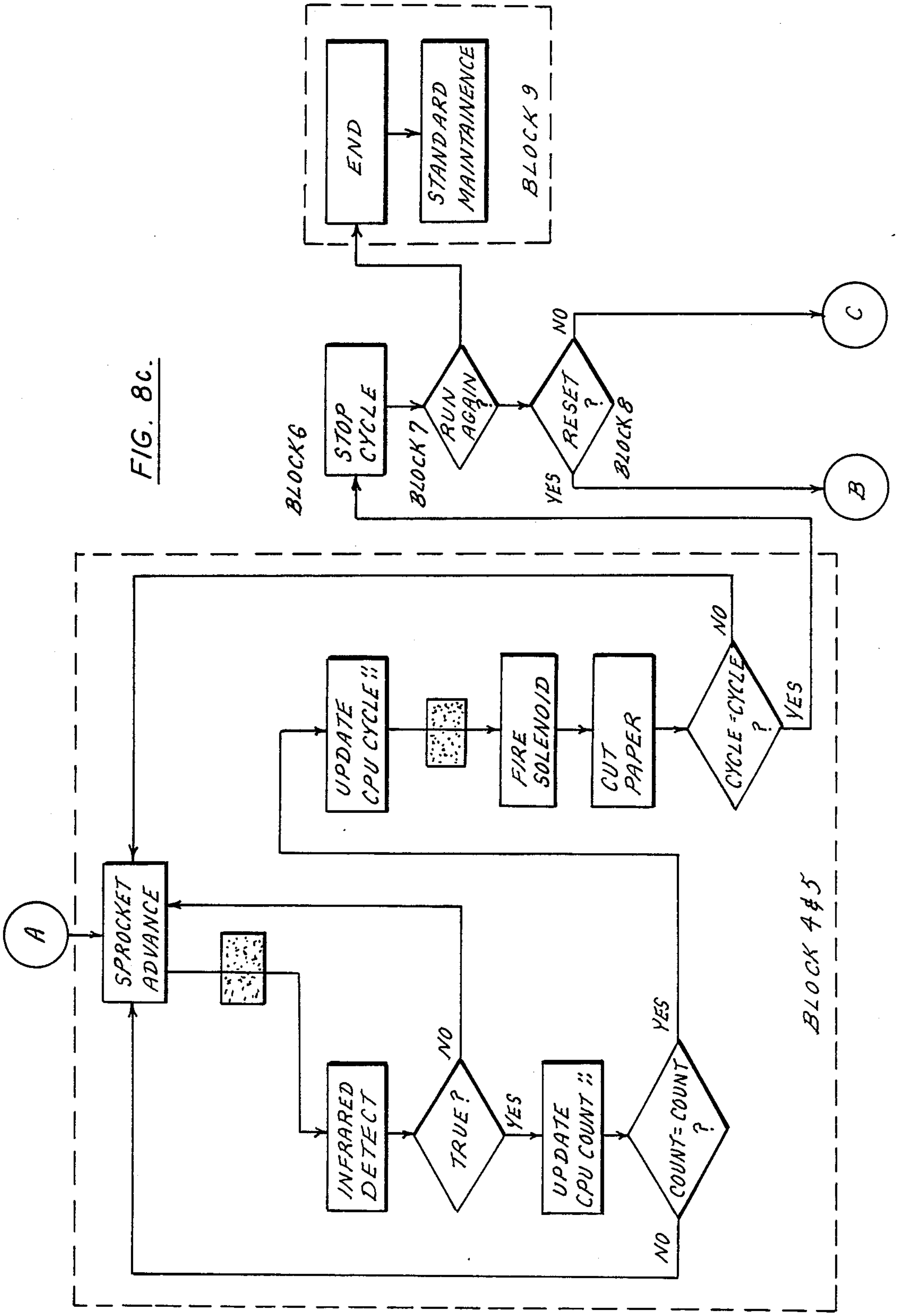

The System Flow diagram illustrated in FIG. 8*a* is expanded in FIGS. 8*b* and 8*c* with respect to Blocks 1 through 9.

System flow is illustrated in FIGS. 8*a*, 8*b* and 8*c* and it will be understood that it is generally a matter of applying the system flow diagram to a particular hardware system in order to design an operating system for the hardware system that corresponds to the illustrated system flow diagrams for establishing the necessary set of commands between the CPU and the separator device.

One embodiment of an operating system suitable for use with the present invention is illustrated in FIGS. 9*a*–9*d*. The source code is written in MICROWARE BASIC 09 brand software for use on an OS-9 System on any 6809E computer. As previously described this embodiment refers specifically to use with a TRS Color Computer III brand processer.

It will be understood that the operating system allows for user input of all pertinent data and yet leaves room for customized options. A specific code will be determined and written for each sensor means in the separator device to be interfaced with the separating means and stepper motor and relays.

It will be advantageous to provide for an adjustment of the distance between opposing sets of tractor feed sprockets, in order to provide for the use of the separator device with nominal standard web widths generally ranging from eight and one half inches ($8\frac{1}{2}''$) wide to fourteen inches (14") wide. Two embodiments of the adjustable tractor feed drive sprockets are illustrated, but it will be understood that other ways for providing adjustment may be provided.

One embodiment of an adjustment means is illustrated in FIG. 10. Only one power transfer shaft is shown, and only the end carrying the adjustable tractor feed drive sprocket is illustrated. The opposite end of the power transfer shaft generally requires no alteration for an adjustable tractor feed drive sprocket embodiment. It will be understood that each power transfer shaft may be modified according to the illustrated embodiment to provide for the desired adjustment.

Referring by characters of reference and first to FIG. 10, a typical power transfer shaft 300 can be supported for rotation by a bearing 302 supported by housing 12. An adjustable tractor feed sprocket 304 is slidably mounted on the turned down portion 306 of shaft 300. The sprocket 304 is slidable between a collar 308 fixed in position on the shaft 300, for example, as by a set screw 310, and a shoulder 312, the shoulder formed by the limit of the turned down portion 306 of shaft 300.

Sprocket 304 can be fixed in position on the shaft with a set screw 314 located in a hub portion 316 of sprocket 304. A flat surface portion 318 on shaft portion 306 is provided in order to increase contact of the set screws to hold the collar and tractor feed sprocket in the desired position.

In operation, the sprocket 304 illustrated in FIG. 10 can be moved between the collar 308 and the shoulder 312 and fixed in position on the turned down portion 306 of shaft 300 with set screw 314. Normally the shoulder 312 will be located on shaft 300 such that a standard eight and one half inch (8½") wide web can be fed through the separator when the sprocket 304 is bottomed out against the shoulder 312. The collar 308 normally will be located on the turned down portion 306 of shaft 300 such that a standard fourteen inch (14") wide web can be transferred through the separator when the sprocket 304 is bottomed out against the collar 308. It will be understood that the sprocket 304 may be also located anywhere between the collar 308 and the shoulder 312. It will be further understood that the position of collar 308 on the turned down portion 306 of shaft 300 may be changed, for example, to provide for a web wider than the standard fourteen inch (14") width.

Another embodiment of an adjustable tractor feed drive sprocket is illustrated in FIG. 11, again illustrating a typical power transfer shaft. Referring now by characters of reference, a power transfer shaft 350 is supported for rotation by a bearing 352 supported by housing 12 and adjustable tractor feed sprocket 354 is slidably mounted on a turned down portion 356 of shaft 350. The sprocket 354 is slidable between a collar 358 fixed in position on the shaft 350, for example, as by a set screw 360, and a shoulder 362, the shoulder formed by the limit of the turned down portion 356 of shaft 350. Sprocket 354 can be fixed in position on the shaft with a cam arm 364 pivotably mounted on a hub portion 366 of tractor feed sprocket 354.

In operation, the sprocket 354 illustrated in FIG. 12 can be moved between the collar 358 and the shoulder 362 and fixed in position on the turned down portion 356 of shaft 350 with cam arm 364. The cam arm 364 is located in hub 366 and pivotably mounted on a pin 368 in the hub to pivot between a locking position and a non-locking position. Preferably the turned down portion 356 of shaft 350 includes a generally concave groove 370 for receiving the cam surface 372 of cam arm 364 so as to lock sprocket 354 in a desired position on the turned down portion 356 of shaft 350.

Normally the shoulder 362 will be located on shaft 350 such that a standard eight and one half inch (8 ½") wide web can be fed through the separator when the tractor feed sprocket 354 is bottomed out against the shoulder 362. The collar 358 will be normally located on shaft 350 such that a standard fourteen inch (14") wide web can be fed through the separator when the tractor feed sprocket 354 is bottomed out against the collar 358. It will be understood that the tractor feed sprocket 354 may also be located anywhere between the collar 358 and the shoulder 362. It will be further understood that the position of collar 358 on the turned down portion 356 of shaft 350 may be changed, for example, to provide for a web wider than the standard fourteen inch (14") width.

The adjustable means illustrated in FIG. 11 may further include a flat surface portion on shaft portion 356 similar to that shown in FIG. 10, reference character 318, in order to provide for better securement of the collar 358 by set screw 360.

In the previously described embodiments for adjustable tractor feed drive sprockets it will be understood that it may be necessary to provide slot means in first and second web support plates 80, 82, respectively, to allow movement of the adjustable tractor feed drive sprockets without interference with the web support plates.

From the foregoing description those skilled in the art will appreciate that all of the aspects of the present invention are realized. A perforated web separator has been provided that is capable of separating a perforated web at either each perforation or at predetermined perforations. The web includes at least one longitudinal tractor feed strip and the holes in the tractor feed strip are counted by sensor means to accurately determine operation of the separating means. The separator device is capable of being integrated with a word processing or data processing system and has an operational flexibility that allows different predetermined lengths of perforated webs to be separated without the need for stopping and then starting the separator device. The present invention separator device is easy to use and can be readily integrated with existing word or data processing systems and printers and printing systems generally used to print webs of paper or forms, continuous form paper or multiple forms or multiple copies. Because of its compact size and ability to interface with existing systems the separator device is generally portable and easily moved between a plurality of printer stations as required. The separator device may be provided with the capability of accepting different width webs with only minor adjustments to the device.

One preferred embodiment of the separator device has been shown and described however it will be understood that other options are possible. For example the separator device may be built into the processing equipment, either word, data or combination of both, or kept separate for mobility and relocated, for example, from one printer station to another as the need requires.

It will be further understood that the preferred embodiment of the separator device has been described and illustrated herein and that the invention is not restricted to the illustrated housing and cover details or arrangement of chambers, compartments, tractor feed means, separating means, interface means or sensor means.

Other modifications or options may be made to or provided for the embodiments illustrated and described without departing from the spirit of the invention. For example, the separated sheets may be diverted directly to a binding machine so that the end product will be finished bound manuals, for example. It is not intended that the scope of this invention be limited to a particular embodiment. Rather, the scope of the invention must be determined by the following claims and their equivalents.

TABLE I

| PARTS LIST | |
|---|---|
| 1 | TRS-80 TM Color Computer III OS-9/DOS s/Multi-pak TM |
| 1 | 40-PIN Edge Card w/case |
| 3 | RS276-142 IR Pair LED Emitter, Photo Transistor Detector |
| 3 | NE5034 8-BIT General Purpose A/D Converter |
| 2 | DAC-08 Series High Speed Multiplying |

TABLE I-continued

| PARTS LIST | |
|---|---|
| | D/A Convertor |
| 2 | RS275-241 SPDT Relay |
| 1 | Dual Output Regulated Power Supply +5/+12 VDC Output |
| 1 | 12 VDC Stepping Motor |
| 3 | Solenoid 12 VDC or 120VAC Input |
| 3 | NE590 Addressable Peripheral Driver |
| . | [may be needed to buffer relays] |

TABLE II

| Parameter | ABSOLUTE MAXIMUM RATINGS | Rating | Unit |
|---|---|---|---|
| Vcc+ | Positive supply voltage | 0 to +6 | V |
| Vcc− | Negative supply voltage | 0 to −15 | V |
| IREF | Reference current | 1.5 | mA |
| Iin | Analog input current | 5.0 | mA |
| Vo | Data output voltage | 6.0 | V |
| Analog | GND to Digital GND | 1.0 | V |
| VL | Logic input voltage | −1 to Vcc+ | V |
| PD | Power dissipation F package | 1000 | mW |
| TA | Operating temperature range | 0 to +70 | t |

TABLE III

| ABSOLUTE MAXIMUM RATINGS Parameter | Rating | Unit |
|---|---|---|
| VCC Supply Voltage | −0.5 to +7 | V |
| VIN Input Voltage | −0.5 to +15 | V |
| VOUT Output Voltage | 0 to +7 | V |
| IOUT Output Current | | mA |
| Each output | 300 | |
| All outputs | 1000 | |

What I claim is:

1. A perforated web separating device comprising:

(a) a tractor feed means for feeding a length of perforated web into operative association with a web separating device, the web including transverse, longitudinally spaced apart perforations, and at least one tractor feed strip including a plurality of holes in serial relationship along the length of the tractor feed strip, the tractor feed means operating at a constant speed, (b) sensor means for sensing the feeding of a pre-determined length of web by the tractor feed means, the sensor means responsive to the passage of a pre-determined number of holes in the tractor feed strip, (c) means for separating the length of web along the perforation in response to a signal from the sensor means corresponding to the passage of a number of holes in the tractor feed strip as the web is continuously fed through the web separating device, (d) interface means for integrated and continuous operation of the tractor feed means, sensor means and separating means whereby separation of the web at the perforation is accomplished during continuous operation of the separating device.

2. A perforated web separating device as set forth in claim 1 further comprising:

(e) adjustment means for adjusting the width between opposing pairs of tractor feed means whereby the tractor feed means may be adjusted to allow different width web to be fed through the separating device.

3. A perforated web separating device as set forth in claim 1 wherein:

(e) the sensor means comprise a plurality of photo-electric transmitters and receivers for counting the passage of the holes in the tractor feed strip.

4. A perforated web separating device as set forth in claim 3 further comprising:

(f) at least one pair of photo-electric transmitting and receiving means provided to detect a perforated web jam.

5. A perforated web separating device as set forth in claim 1 wherein:

(e) the interface means includes a programmable central processing unit.

6. A perforated web separating device as set forth in claim 1 wherein:

(e) the web is a perforated tractor feed paper.

7. A perforated web separating device as set forth in claim 1 wherein:

(e) the web comprise a series of forms.

8. A perforated web separating device as set forth in claim 1 further comprising:

(e) a central processing unit operatively associated with the interface means.

9. A perforated web separating device as set forth in claim 8 further comprising:

(f) an operating system for establishing a necessary set of commands between the central processing unit and the interface means.

10. A perforated web separating device as set forth in claim 1 wherein:

(e) the interface means further including a plurality of analog-digital conversion means and digital-analog conversion means.

11. A method for continuous operation of a perforated web separating device comprising the steps of:

(a) turning on a central processing unit and a perforated web separating device, (b) loading and running an operating system providing operational programming compatible with the central processing unit for establishing a necessary set of commands between the central processing unit and the perforated web separating device, (c) setting run-time parameters, (d) loading a perforated web into the perforated web separating device, (e) engaging at least one tractor feed strip of the perforated web with at least one sprocket of the perforated web separating device, (f) running the perforated web separating device for separating the web along at least one perforation, and (g) cycling the perforated web separating device.

12. A method for continuous operation of a perforated web separating device as set forth in claim 11, further comprising the steps of:

(h) pausing at the end of the cycle to determine whether to stop or run again.

13. A method for continuous operation of a perforated web separating device comprising the steps of:

(a) turning on a central processing unit and a perforated web separating device, (b) loading and running an operation system providing operational programming compatible with the central processing unit for establishing a necessary set of commands between the central processing unit and the perforated web separating device, (c) setting run-time parameters, (d) loading a perforated web into the perforated web separating device, (e) running the perforated web separating device for separating the web along at least one perforation, (f) feeding a length of perforated web into operative association with the web separating device, the web including transverse, longitudinally spaced apart perforations and a tractor feed strip including a plurality of holes in serial, longitudinally spaced relationship, (g) sensing the passage of the tractor feed strip holes, (h) generating a signal corresponding to the passage of a pre-determined number of holes, (i) interfacing the signal with a separating means in correspondence with the run-time parameters, (j) separating the length of web along the perforation with the separating means in response to the previously set run-time parameters, (k) operating the perforated web separating device continuously, and (l) cycling the perforated web separating device.

14. A method for continuous operation of a perforated web separating device as set forth in claim 11, further comprising the steps of:

(m) pausing at the end of the cycle to determine whether to stop or run again.

* * * * *